United States Patent [19]

Heyerman

[11] Patent Number: 4,805,336
[45] Date of Patent: Feb. 21, 1989

[54] ICE FISHING ROD

[76] Inventor: Thomas A. Heyerman, 5556-36th Avenue South, Minneapolis, Minn. 55417

[21] Appl. No.: 78,014

[22] Filed: Jul. 27, 1987

Related U.S. Application Data

[63] Continuation of Ser. No. 873,992, Jun. 13, 1986, abandoned.

[51] Int. Cl.$^4$ .............................................. A01K 97/12
[52] U.S. Cl. ................................... 43/17; 242/84.5 R
[58] Field of Search ............... 43/15, 16, 17; 248/519; 24/336, 339; 242/84.5 R, 99

[56] References Cited

U.S. PATENT DOCUMENTS

| | | | |
|---|---|---|---|
| 1,433,933 | 10/1922 | Caldwell | 24/336 |
| 2,402,877 | 6/1946 | Dial | 24/339 |
| 2,970,400 | 2/1961 | Nolin | 43/17 |
| 3,213,561 | 10/1965 | Roemer | 43/17 |
| 3,937,415 | 2/1976 | Prinz | 242/84.5 R |

FOREIGN PATENT DOCUMENTS 221632 7/1968 Sweden .................................. 43/17

Primary Examiner—Kurt Rowan
Attorney, Agent, or Firm—Douglas L. Tschida

[57] ABSTRACT

Ice fishing apparatus adaptable for use in either an attended or unattended fashion and including a reel mounted strike/line feed indicator for real time displaying a fish strike condition. The apparatus comprises a relatively stiff rod section mounted to a reel containing handle section. A drag assembly mounted to the handle and contacting the circumferential edge of the reel provides adjustable line tensioning. A high visibility strike indicator detachably mounts to the face of the reel and overlaps the reel face, whereby the angler is able at a distance to observe movement of the indicator, with the removal of line from the reel. When used in an unattended fashion, a hole cover and associated rod support means maintain the rod in upright relation to the hole for maximum visibility.

19 Claims, 3 Drawing Sheets

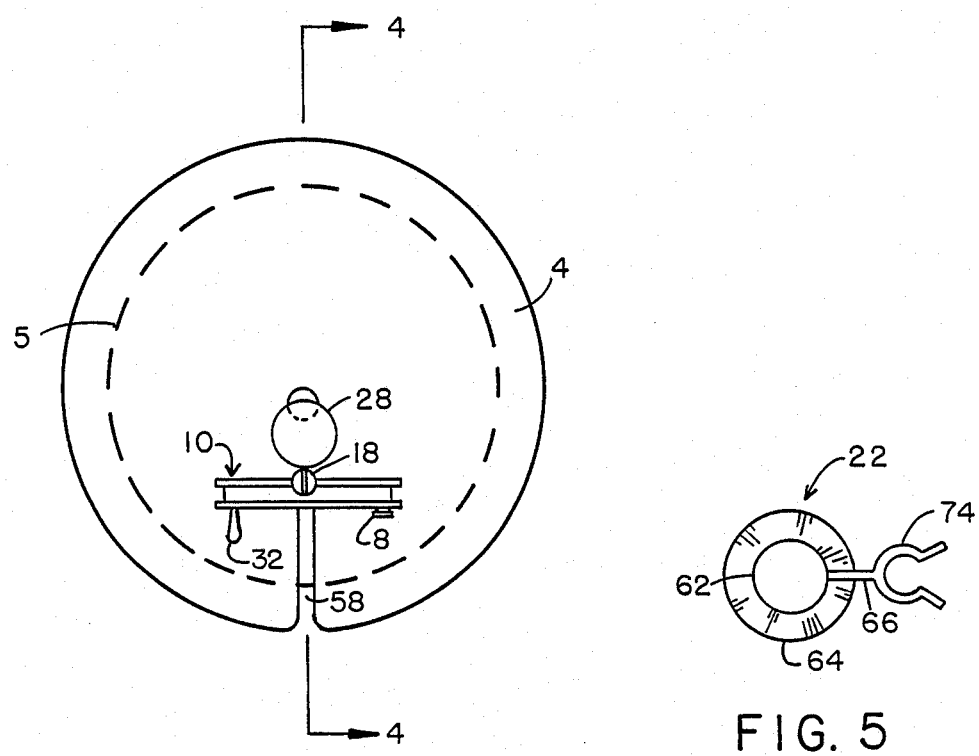
FIG. 3
FIG. 5
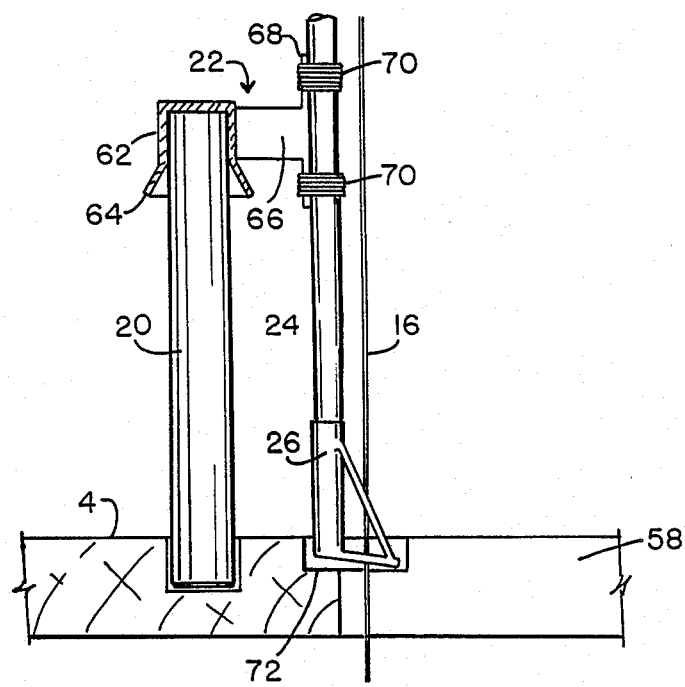
FIG. 4

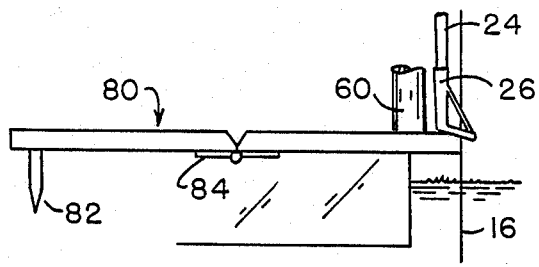
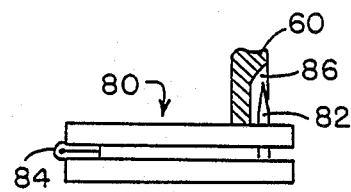
FIG. 6   FIG. 7
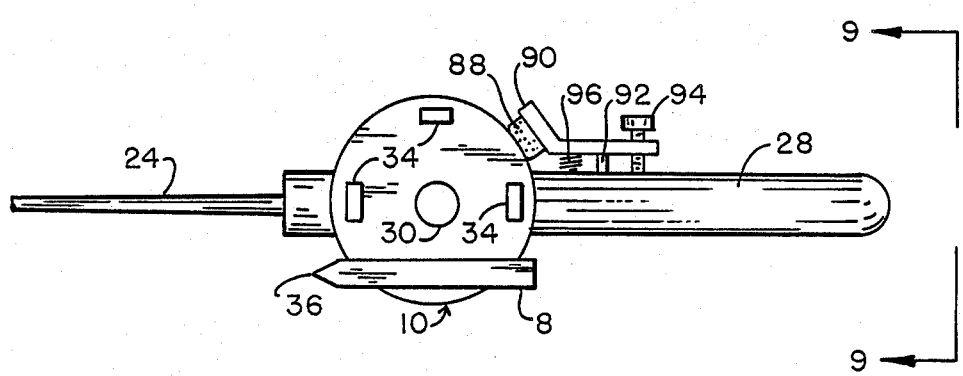
FIG. 8
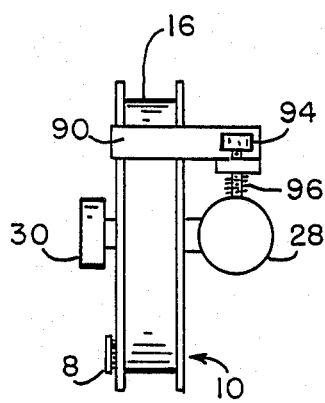
FIG. 9

ICE FISHING ROD

This is a continuation, of application Ser. No. 6,873,992, filed 06/13/86, abandoned.

BACKGROUND OF THE INVENTION

The present invention relates to ice fishing apparatus and, in particular, to an ice fishing rod assembly adaptable for use in either a conventional attended fashion or alternatively in an unattended fashion.

Over years of winter sport fishing on frozen ice, a number of inventions have been developed by and for ice fishermen to make the experience more enjoyable. Portable ice shelters, in particular, allow the fisherman to fish in a heated enclosure in relative comfort. However, given the difficulties of moving many of such shelters and the desire of most fisherman to explore a variety of possible fish holding structure within a proximal area, a host of remotely triggered devices have been developed to indicate a fish strike to the fisherman, who then may attend any tripped devices, either retrieving any hooked fish and/or re-baiting the line and/or resetting the device.

Such devices predominantly comprise a reel containing spooled line which mounts either above or below the surface of the ice, and include an indicator device which is visible above the ice, upon being triggered by a striking fish. Some examples of devices wherein the reel mounts beneath the ice surface can be seen upon directing attention to U.S. Pat. Nos. 4,021,958 and 3,888,035. The former patent discloses a traditional tip-up assembly wherein a springloaded flag is released with the release of line from the reel. The latter patent discloses a combination rod-type device containing a spring-loaded flag which mounts through the ice hole when used as a remote indicator or alternatively may be used in a conventional fashion as a so-called "jiggle stick". A relatively non-adjustable reel snubbing element is also disclosed for bearing against the peripheral edges of the reel to act as a drag.

A number of other assemblies mounting above the ice surface are shown in U.S. Pat. Nos. 1,230,467; 2,811,802; 2,934,849; 3,545,118; 3,745,689; and 4,016,670. Of the disclosed devices, each generally suspends a spooled reel of line over an exposed ice hole in relation to a strike indicator mechanism for signaling a fish strike. The U.S. Pat. No. 3,745,689 patent also discloses an integral sheltering assembly for preventing the buildup of snow in the hole. The U.S. Pat. No. 3,545,118 reference discloses means for preventing the water in the hole from freezing.

A number of other more simplistic arrangements suspending pieces of cloth or the like from the line above an ice hole can be seen in the 1984 December-January edition of "In Fisherman", Book No. 58 at page 82.

Still other rod-type ice fishing devices are disclosed in U.S. Pat. Nos. 2,897,622 and 3,530,611. In contrast however to the device disclosed in the U.S. Pat. No. 3,888,035 patent, each of the latter devices is mountable above the ice hole with the reel in a free spool condition and a triggered flag assembly mounting in relation thereto.

As mentioned, each of the foregoing devices provides a trip mechanism for indicating a fish strike and which indicators principally comprise the tripping of a spring-loaded flag, the tipping of a pivoting arm or the flashing of an appurtenant light. With the exception possibly of the flashing light mechanism disclosed in U.S. Pat. No. 3,545,118 or the assemblies from the "In Fisherman" article, most devices operate only to indicate a threshold event (i.e. the tripping of the indicator mechanism) and do not provide a relative indication of the status of the fish strike. That is, they do not indicate whether or not the fish is taking line, as opposed to merely having tripped the device. The mechanism of the 3,545,118 patent does provide a directional flashing with continuing line movement, but the assembly is deficient in that the reel may stop intermediate the provided contact positions and which would not indicate anything to the fisherman.

Accordingly, it is a primary object of the present invention to provide an ice fishing assembly including a high visibility fish strike and uninterruptable line feed indicator.

It is a further object of the invention to provide a combination assembly permitting its alternative use as either a conventional fishing rod or as an unattended remote strike/line feed indicator.

It is a still further object of the invention to permit the selective adjustment of the line tension via a handle mounted reel contacting drag assembly, including a compressive member contacting the circumferential edge of the reel, so as to establish other than a free spool condition at the bait.

It is yet another object of the invention to permit the covering of the ice hole, with the rod assembly suspended thereover, to prevent snow and ice buildup in the hole and retard freezing within the hole.

It is a still further object to provide an easily stored rod stand which permits the use of the invention in fish houses or on pleasant days.

The above objects, advantages and distinctions, among others, as well as the construction of the invention will however become more apparent upon reference to the following description thereof with respect to the appended drawings. Before referring thereto though it is to be appreciated that the invention is described with respect to its presently preferred embodiment and various presently contemplated modifications and is thus not intended to be all-inclusive and should not be interpreted in limitation of the scope of the invention.

SUMMARY OF THE INVENTION

An ice fishing assembly adaptable for alternative use in either an attended or unattended fashion. The fishing rod assembly is comprised of a handle section and to which a relatively stiff, short rod section is mounted. One or more eyelet type line guides are, in turn, secured to the rod section.

A spool type reel is mounted to the handle section and contains a sufficient length of fishing line to accommodate a maximum anticipated fish run. A center-mounted, threaded stud and thumb screw provide a locking mechanism for preventing the reel from turning or, alternatively, placing the reel in a free spool condition. A handle facilitates line take-up.

Mounted also to the face of the reel are a plurality of Velcro TM type fasteners which are positioned at the four major quadrants of the reel face. Selectively secured to one of these fasteners is an elongated pointer or strike indicator and which is constructed of a weather-resistant, light-reflective material in a fluorescent or other high visibility color. The length and width of the indicator is sized to be visible at a distance and whereby its relative position to the upright fishing rod indicates line movement and a fish strike to the fisherman.

Also mounted to the handle section is a drag mechanism comprised of a foam snubber element mounted to a length adjustable means. The snubber element may thus be brought into controlled contact with at least one circumferential edge of the reel spool and whereby the tension at which line is released can be adjusted.

A slot containing disk-like hole cover, usable with the fishing rod, mounts over an ice hole and prevents against snow buildup therein and retards ice formation. An associated pegged rod holder supports the rod in upright relation to the hole cover over the slot. In various alternative embodiments, the rod holder comprises a peg which is detachably mountable to the hole cover and to which a clip-type cap member is secured. The clip member is, in turn, either permanently or detachably secured to the rod.

In an alternative embodiment of the hole cover and in lieu of mounting entirely over the hole, a rod stand mounts to one side of the hole. The stand is also hinged at its approximate midpoint and includes an ice awl at one extreme end for mounting in the surface ice. A pegged holder is mounted at the other extreme end and contains a notch, whereby upon folding the stand, the awl mounts in the notch An alternative drag assembly is also disclosed and wherein a foam snubber element is mounted to a spring-loaded carrier. An associated thumb screw mounted to the carrier permits the selective adjustment of the drag and line tension.

BRIEF DESCRIPTION OF THE DRAWINGS

FIG. 3 shows a top view taken along reference lines 3—3 of FIG. 1 and the mounting relation of the rod to the hole cover.

FIG. 4 shows a detailed front view taken along reference lines 4—4 of FIG. 3 of one embodiment of the rod-holding clip member and which is permanently secured to the rod.

FIG. 5 shows a top view of an alternative clip member which is detachable from the rod.

FIG. 6 shows a front view of an alternative rod stand usable in lieu of the hole cover on pleasant days or in an ice shelter.

FIG. 7 shows a collapsed view of the rod stand of FIG. 6.

FIG. 8 shows a front view of an alternative reel drag assembly.

FIG. 9, taken along reference lines 9—9 of FIG. 8, shows an end view of the assembly of FIG. 8.

DESCRIPTION OF THE PREFERRED EMBODIMENT

Figures 1, 2:
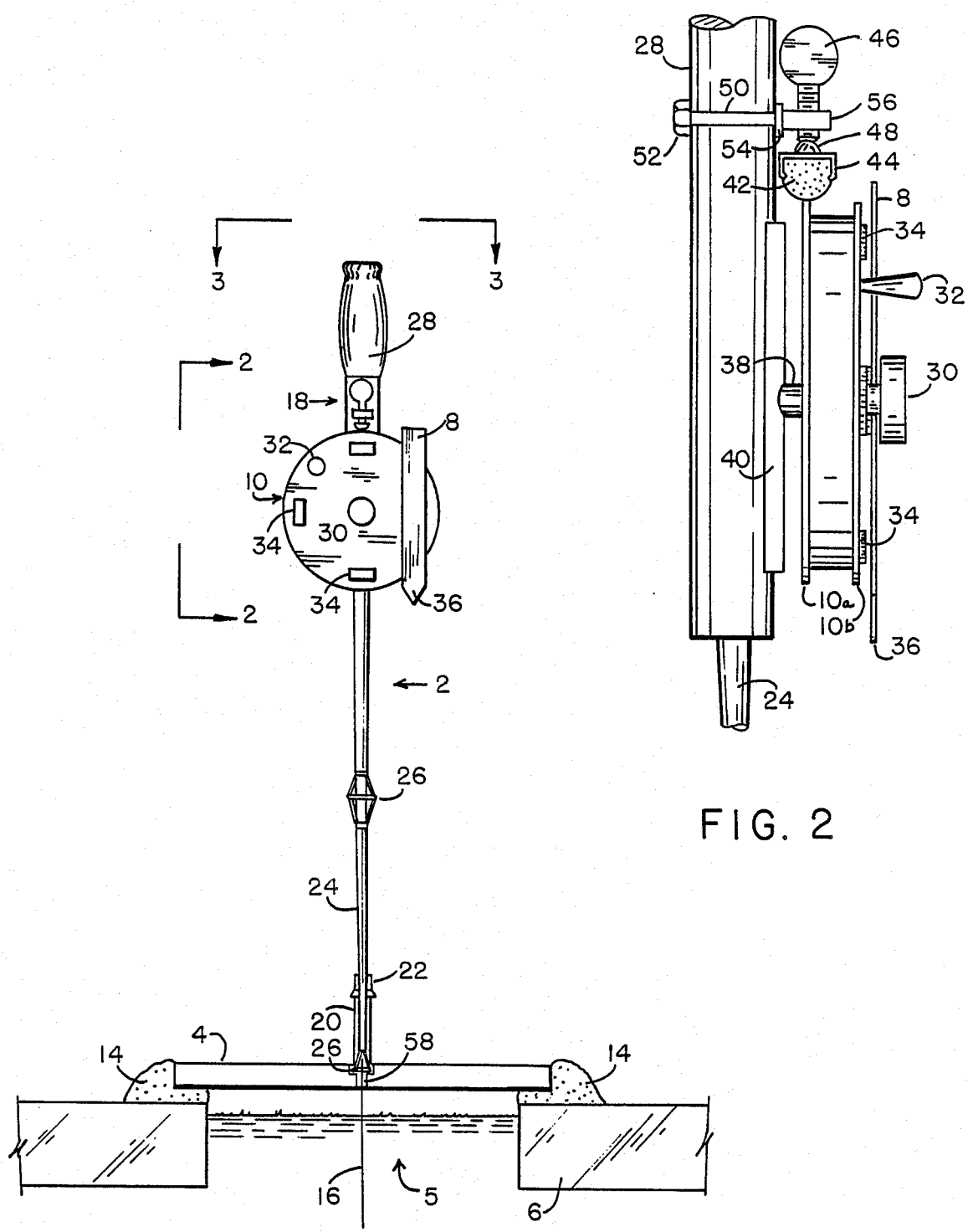
FIG. 1 shows an assembled front view of the invention in mounted, unattended relation to an ice hole.
FIG. 2 shows a detailed side view taken along reference lines 2—2 of FIG. 1 of the reel and the drag assembly.

Referring to FIG. 1, a front view is shown of the present ice fishing assembly in its unattended mounting relation to an ice hole. In particular, the ice fishing rod assembly 2 is supported in inverted or upright relation to a hole cover 4, which is mounted over a hole 5 drilled through the ice 6. In this arrangement, the assembly 2 is able at relatively long distances to alert an ice fisherman of a fish strike and provide a real time line feed condition via the rotation of a high visibility strike indicator 8 mounted to the face of a line containing reel 10. As the line 16 is fed to the striking fish, the changed and/or moving condition of the indicator 8 alerts the fisherman to the strike condition and its current status.

Before addressing various of the details of the assembly of FIG. 1, it is to be appreciated that an ice hole 5 must first be prepared and which may be accomplished with any type of available ice auger, whether manual or powered, and after which accumulated slush or ice chips 14 are typically cleared from the hole 5. Some of this slush 14 may as desired be mounded around the sides of the hole 5 and screeded to create a substantially level surface for supporting the hole cover 4 in sheltered relation to the wind and drifting snow. Antifreeze, alcohol or other non-freezing substances may also be poured over the exposed water to prevent surface freezing. Upon mounting the rod assembly 2 to the hole cover 4 and suspending the line 16 in the hole 5, the line 16 is thus prevented from freezing in and/or otherwise becoming restrained, except by the drag mechanism 18, and is able to feed freely to a striking fish without noticeable resistance and/or backlash, such as might occur if he reel 10 is in a free spool condition.

Attached to the hole cover 4 is a removable mounting peg 20 that extends generally perpendicular thereto and to the top of which is detachably secured a clip 22 which, in turn, grasps the rod assembly 2 approximately three to eight inches above the hole cover 4. In addition to supporting the rod assembly 2, the peg 20 serves as a handle for removing the cover 4, such as when tending the line 16. Mounted along the length of the flexible rod section 24 are eyelets or line guides 26. The most forward line guide 26 being mountable within a slight recess 72 (see FIG. 4) found in the hole cover 4.

By appropriately sizing and weighting the hole cover 4 and recognizing that the flexible rod section 24 is of a relatively stiff or rigid construction, as well as being somewhat short in length (i.e. 12 to 24 inches), it is to be appreciated that the present mounting configuration provides a relatively stable assembly that will not tip over under commonly encountered wind conditions. To the extent also of any rod movement, it is to be further appreciated that this is not altogether undesirable in that it induces a jigging action at the bait.

Returning to the construction of the reel 10, it generally is molded from a non-freezing plastic and comprises front and back disk portions which are separated from one another via a bored center hub portion. A threaded stud extends from a mounting plate at the handle section 28 through the bore of the hub and secures the reel 10 to the handle 28. A thumb screw 30 enables the locking of the reel 10's rotation.

A partial drag adjustment may also be obtained by varying the pressure on the thumb screw 30, and which also affects the tension at which the reel 10 turns. This tension may however change, since the screw 30 can bind against the reel and either tighten or loosen by itself as the reel turns. Most commonly therefore the thumb screw 30 is either tightened completely to prevent the reel 10 from turning or alternatively loosened to permit the reel to turn in a free-spool condition, such as when setting the rod 2 up in the fashion of FIG. 1. Thereafter, the drag assembly 18 is used to fine adjust the desired line tension.

Mounted to the face of the reel 10 is a molded handle 32 and which facilitates the retrieval of the line 16. Mounted also at the four major quadrants of the reel face are a number of Velcro ™ strips 34; although it is to be appreciated that a concentric ring of Velcro ™ might instead be used. A mating piece of Velcro ™ is attached to the back of the strike indicator 8 and which allows the angler to set the strike indicator 8 at any desired position, when first setting the assembly 2. As shown in FIG. 1, the pointer 36 of the indicator 8 is set to point down, parallel to the flexible rod section 24, and thus the angler can detect a strike by a subsequent relative comparison of the indicator 8 to the rod 2. A change in position confirms a strike and a continuing movement of the indicator 8, indicates that the fish is taking line.

Heretofore, it was not possible to monitor line feed with conventional flag-type tip-ups, since they are principally intended to identify a strike and no more. While one of the mentioned prior art assemblies did provide a directional flashing light indication of line feed, it did so only so long as the switch contacts were closed. A further perceived shortcoming of this device is that during daylight hours, such a signal is not as visible an indication as the present indicator 8. Furthermore, given that most states have laws controlling night fishing and that the predominant numbers of fishermen, fish during the day, it is believed that the present assembly offers the greatest advantages.

Turning attention next to FIG. 2, a detailed side view is shown of the assembly 2's handle section 28 and the mounting relation of the reel 10 and drag assembly 18 thereto. Directing attention first to the reel assembly, a better view is, in particular, had of the mounting relation of the reel 10 to the handle 28 via the threaded stud 38 which extends from the mounting plate 40. The mounting plate 40 being secured to the handle 28 via screws (not shown) and whereafter the reel spool 10 is mounted over and secured to the stud 38 via the thumb screw 30. Also, the inner and outer disk portions 10a and 10b of the reel 10 can better be seen.

Mounted adjacent to the reel 10 is the drag assembly 18 and which is positioned to contact the circumferential edge of the inner reel disk 10a, although it is to be appreciated that the outer disk portion 10b could also be contacted. In particular, a compressible snubber member 42, constructed of a foam, rubber or other closed cell material which is unaffected by the encountered temperatures, is positioned to adjustably contact the circumferential edge of the reel disk 10a with a selected amount of pressure as established by the fisherman. A free spool condition is particularly disadvantageous given that with the running of a fish with the bait, any retained inertia in the reel 10 may cause the reel 10 to continue to turn after the fish stops, with the development of a backlash. Accordingly, it is desirable to adjust the snubber element 42 to some greater pressure, but not such as to cause a striking fish to sense the tension and release the bait. In any case though a fisherman via the about to be described drag adjustment assembly can establish a desired tension on the line 16.

Relative to the drag assembly 18, it is to be noted that the snubber member 42 is mounted within a U-shaped carrier 44 and the sides of which are crimped into the snubber member 42. Alternatively, the snubber member 42 may be glued to the carrier 44 or else an oversize member 42 might be compressibly inserted into the carrier 44. The carrier 44, in turn, is secured to a threaded thumb screw 46 via an intermediate ball or swivel joint 48, with the thumb screw being mounted through a shouldered carrier 50.

The shoulder carrier 50 mounts through a hole in the handle 28 and is secured via a nut 52. A stop shoulder 54 on the reel side of the handle 28 is keyed into handle 28 to prevent against the rotation of the drag assembly 18 with respect to the reel 10. It also determines the ultimate separation of the assembly 18 from the handle 28. An adjacent threaded eye portion 56 receives the thumb screw 46 and whereby the snubber member 42 may be brought into controlled engagement with the edge of the reel disk 10a.

Before turning attention to the construction of the rod holder assembly, attention is directed to the top view of FIG. 1 as shown in FIG. 3. As mentioned, the hole cover 4 is sized to be larger than the anticipated ice hole 5 and which is shown in dotted line, with the cover 4 being mounted concentrically thereover. The line 16 passes through the hole cover 4 by way of a slot 58 which is formed into the cover 4, the slot preferably being as thin as possible. Alternatively, a hole may be provided, but which requires that the live bait and/or ice lure must be threaded therethrough, and which is an inconvenience, especially where a fish has taken the bait and it is necessary to tend the assembly 2 to retrieve the fish. With a slot 58, however, upon detecting a strike, the hole cover 4 may be easily removed from about the line 16 to allow the fisherman to play the fish with the aid of the rod 2. The rod 2 provides a further advantage to recovering the fish in that as with most heretofore known devices, a hand-over-hand retrieval is required, but which is less forgiving of an unanticipated fish run and may result in line breakage. Also, by allowing the retrieved line to collect on the ice, the line may fray on ice chips with later breakage. Accordingly, a rod and reel and slotted hole cover 4 are preferred.

Relative to the rod holder 20, attention is next directed to FIG. 4 and wherein a partial cross-section view taken along reference lines 4-4 of FIG. 3, through the slot 58, is shown. As seen in this view, the rod holder peg 20 is removably mounted in a mating hole in the hole cover 4 to stand upright therefrom. Alternatively, the peg 20 and hole cover 4 might be constructed with mating threads or some other fastener means, but the intent is to permit the disassembly of the peg 20 from the cover 4, when not in use, and which facilitates storage.

Mounted, in turn, to the flexible rod section 24 is the clip 22 and which is shown in partial cross-section. Specifically, the clip 22 comprises a cap-like peg grasping portion 62 and which has outwardly tapered edges 64 for facilitating its mounting over the top of the peg 20. A transition section 66 couples the peg holding section 62 to the rod portion 24 and where a pair of flanges 68 extend outwardly from the transition section 66 and are bound to the rod 24 in a permanent fashion via sealed, threaded wrappings 70, such as are used to secure the eyelets 26 to the rod section 24. Thus, the clip 22 is permanently mounted to the rod 24. Also shown in FIG. 4 is the notch 72 which is formed at the top, interior end of the slot 58 for receiving the front eyelet 26.

Turning attention next to FIG. 5, it is to be appreciated that in lieu of a permanently attached clip 22, the clip 22 might be constructed to be releasable not only from the peg 20, but also the rod section 24. Accordingly, FIG. 5 discloses a top view of such a clip and which essentially is the same as that disclosed for FIG. 4, except that a C-shaped resilient clip portion 74 is provided in lieu of flanges 68 and which may be snapped over the rod section 24 to restrain it in an upright position. Because the rod section 24 does not taper over its length, the clip 74 would similarly not vary over its vertical length. However, where a tapered rod portion 24 might be used, the clip portion 74 could be designed to accommodate the taper. Furthermore, it is to be appreciated that where an ice fisherman already owns one or more ice fishing rods, such rods might be adapted with the aid of such a clip 22 to the present hole cover 4, depending upon the rigidity of the rod section 24.

Recognizing further that the present assembly has application for use within a fish house or during pleasant weather, FIG. 6 discloses an alternative embodiment of a rod stand 80 for supporting the rod 2. Specifically, the stand 80 is constructed in two pieces with a center mounting hinge 84, an ice awl 82 mounted at one extreme end and a rod holder peg 60 at the other. Whereas the hole cover 4 mounted over the entire hole 5, the holder 80 is intended to mount the rod 2 only over the side of the hole, without covering the hole 5. That is, upon unfolding the holder 80, the ice awl 82 can be set into the ice by stepping on the overlying portion of the holder 80. The rod is then mounted in the fashion described earlier to the peg 60, with the line now running directly into the water, instead of through the slot 58. In lieu of mounting the holder 80 to the ice, it is also to be appreciated that it can just as easily be mounted to the floor of an ice fishing shelter and with the detection of a fish strike, be flipped up and out of the way to permit playing the fish with the rod 2. Chambered edges being provided at the hinge 84 to facilitate the folding of the stand 80.

FIG. 7 shows a view of the stand 80 of FIG. 6 in its folded condition and wherein the ice awl 82 mounts through the peg containing portion of the stand 80 to be received within a recess 86 formed in the peg 60. The peg 60 is also permanently mounted to the stand 80 in this embodiment. Further, it is to be appreciated that the platform 80 can be constructed of a suitable plastic or other material of sufficient weight, in lieu of wood, just as can the hole cover 4.

Lastly, attention is directed to FIGS. 8 and 9 and wherein respective front and end views are shown of an alternative arrangement of the previously mentioned drag assembly 18 and which mounts to the handle section 28 so as to contact both disk portions 10a and 10b with its snubber element 88. Whereas the assembly 18 depended on a vertically disposed thumb screw 46, the assembly of Figures 8 and 9 comprises an L-shaped bracket 90 and to which the compressible snubber 88 is mounted. Now the bracket 90 is secured to the handle portion 28 in a spring-loaded pivoting fashion relative to a center pivot 92 and to one side of which is positioned a thumb screw 94 which passes through a threaded hole in the bracket 90 and rests in a cupped recess (not shown) in the handle 28. An associated oppositely mounted spring 96 normally biases the bracket 90 outwardly and away from the reel 10, but with the adjustment of the thumb screw 94, it can be adjusted to bring the snubber element 88 into contact with the reel 10. Thus, the drag assembly of FIGS. 8 and 9 not only permits the selective adjustment of the line tension, but also prevents the line 16 from becoming ensnarled about the reel 10, such as during back-reeling, by restraining the line between the disk portions 10a and 10b.

While the present invention has been described with respect to its presently preferred embodiment and various modifications thereto, it is to be appreciated that still other modifications might be suggested to those of skill in the art upon exposure hereto. Accordingly, it is contemplated that the following claims should be interpreted so as to include all those equivalent embodiments within the spirit and scope thereof.

What is claimed is:

1. Ice fishing apparatus comprising:
   (a) a fishing rod having a handle and a flexible rod member extending therefrom;
   (b) a spooled reel of fishing line rotatively mounted to said handle and passing through a tip mounted line guide of said rod;
   (c) an ice hole cover member having a fishing line receiving slot extending inwardly from an outer peripheral edge and including a recessed notch adjacent said slot; and
   (d) means for detachably securing said fishing rod to said cover member in upright relation with the line guide mounted in said notch and said rod pointing down with said fishing line passing through the slot.

2. Apparatus as set forth in claim 1 wherein said rod securing means comprises:
   (a) a peg member extending from said cover member in perpendicular relation to an upper surface thereof; and
   (b) a clip member having a first portion mounting to said peg and a second portion mounting to said fishing rod.

3. Apparatus as set forth in claim 2 wherein said first clip portion comprises a tubular member having outwardly flaring walls at one end thereof and said second clip portion comprises a pair of longitudinally coextensive flanges which are permanently mountable to said rod member.

4. Apparatus as set forth in claim 2 wherein said first clip portion comprises a tubular member having outwardly flaring walls at one end thereof and said second clip portion comprises a second longitudinally coextensive tubular member wherein the tube wall is slit lengthwise to receive and mount about said rod member.

5. Apparatus as set forth in claim 1 wherein said cover member is hinged to fold upon itself and includes means for securing said cover member to a support surface.

6. Apparatus as set forth in claim 1 including:
   (a) a high visibility strike/line feed member; and
   (b) means for detachably securing said strike/line feed member to a face of said reel to revolve therewith and indicate at a distance rotational movement of said reel.

7. Apparatus as set forth in claim 1 including drag means mounted to said handle for adjustably frictionally engaging at least one circumferential edge of said reel and thereby varying the tension at which said reel rotates.

8. Apparatus as set forth in claim 7 wherein said drag means includes:
   (a) a carrier member;
   (b) a compressible, non-freezing snubber member mounted to said carrier member and contacting the reel edge; and
   (c) a traveling threaded member coupled to said carrier via an intermediate swivel joint for adjustably varying the compression of said snubber member against the reel edge and thereby the drag tension.

9. Apparatus as set forth in claim 7 wherein said drag means includes:

(a) an L-shaped bracket;
(b) a compressible snubber member mounted to said bracket and contacting the reel edge;
(c) means for spring biasing said bracket; and
(d) means engaging said bracket for selectively adjusting the compression of said snubber member against the reel edge.

10. Apparatus as set forth in claim 6 wherein said strike/line feed member comprises an elongated, brightly colored pointer having a fastener member mounted thereto and said reel face includes at least one mating fastener member whereat said pointer may be secured to extend outwardly therefrom.

11. Ice fishing apparatus comprising:
(a) a fishing rod having a handle and a flexible rod member extending therefrom;
(b) a spooled reel of fishing line rotatively mounted to said handle;
(c) an ice hole cover including a line receiving slot extending inwardly from an outer peripheral edge;
(d) a peg member mounted to extend from an upper surface of said hole cover; and
(e) a clip member having a first portion mounting to said peg and a second portion mounting to said fishing rod when positioned in upright relation to said hole cover with said fishing line passing through said slot.

12. Apparatus as set forth in claim 11 including means rotatively mounted to and extending outwardly from said reel to indicate at a distance removal of line therefrom.

13. Apparatus as set forth in claim 11 including means mounted to said handle including a coplanar, linearly actuable snubber member contacting at least one circumferential edge of said reel for varying the contact resistance between said snubber member and reel edge and thereby the tension at which said reel rotates.

14. Improved fishing apparatus having a rotatively mounted spooled reel of line, the improvement comprising:
(a) an indicator member dimensionally wider than a rotative face of said reel, susceptible of being seen at relatively great distances and having a fastener member secured thereto; and
(b) at least one mating fastener member secured to a rotative face of said reel for detachably securing said indicator member at a first position relative to said fishing line to continuously revolve with said reel as line is removed and without obstructing the line retrieval via a separately mounted reel handle such that line removal is detectable at a distance via a changed indicator position.

15. Apparatus as set forth in claim 14 wherein said indicator member comprises an elongated, brightly colored pointer having a fastener member mounted thereto and said reel face includes at least one mating fastener member whereat said pointer may be secured to extend outwardly therefrom.

16. Apparatus as set forth in claim 15 wherein said indicator member is an arrow.

17. Apparatus as set forth in claim 15 wherein said reel face includes a plurality of mating fastener members mounted at each outer peripheral quadrant.

18. Improved fishing apparatus having a rotatively mounted spooled reel of line, the improvement comprising:
(a) an indicator member dimensionally wider than a rotative face of said reel, susceptible of being seen at relatively great distances and having a fastener member secured thereto; and
(b) at least one mating fastener member secured to a rotative face of said reel for detachably securing said indicator member at a first position relative to said fishing line to continuously revolve with said reel as line is removed and without obstructing line retrieval via a separately mounted reel handle such that line removal is detactable at a distance via dynamic changes of indicator position.

19. Improved fishing apparatus having a rotatively mounted spooled reel of line, the improvement comprising:
(a) a flat elongated indicator member dimensionally longer than the width of a rotative face of said reel, susceptible of being seen at relatively great distances and having a fastener member secured to one surface; and
(b) a concentric ring of a mating fastener member secured t a rotative face of said reel for selectively detachably securing said indicator member at a desired initial position relative to said fishing line to revolve with said reel without obstructing line removal or retrieval via a separately mounted reel handle such that line removal is detectable at a distance via dynamic changes of indicator position.

* * * * *